United States Patent [19]

Beers

[11] 4,305,727
[45] Dec. 15, 1981

[54] USE OF AN ORGANIC ACID AS AN EMBRITTLING AGENT FOR WASTE

[75] Inventor: Robert C. Beers, Anaheim, Calif.

[73] Assignee: Occidental Research Corporation, Irvine, Calif.

[21] Appl. No.: 62,081

[22] Filed: Jul. 30, 1979

[51] Int. Cl.³ .......................... C10L 5/46; C10L 9/02
[52] U.S. Cl. ........................................ 44/1 D; 44/1 C
[58] Field of Search ................ 44/1 R, 1 D, 1 F, 1 C

[56] References Cited

U.S. PATENT DOCUMENTS 1,522,304  1/1925  Lang ..................................... 44/1 R
3,961,913  6/1976  Brenneman et al. ................. 44/1 D

OTHER PUBLICATIONS

Investigation of Adv. Thermal-Chem. Concepts for Obtaining Improved MSW-Derived Products, EPA-600/7-78-143.

*Primary Examiner*—Carl F. Dees

[57] ABSTRACT

The instant invention relates to a method of converting the solid organic fraction of solid waste into a powdered fuel which comprises heating said solid organic fraction in the presence of an organic acid for a time and at a temperature sufficient to embrittle said solid organic fraction, comminuting said embrittled solid organic fraction to a powder which is less than a predetermined particle size, and recovering said powder.

The solid organic fraction may be separated from the solid waste prior to treatment by the process of this invention or alternatively the solid waste can be treated by the method of this invention and the embrittled organic fraction separated therefrom. The organic acid may be added to the solid organic fraction as an aqueous solution, a gas, or solid, preferably as an aqueous solution of oxalic acid. The embrittling process takes place at a temperature of at least 125° C., preferably from 150° C. to 250° C. and said embrittled solid organic fraction is preferably comminuted to a predetermined article size of less than 10 mesh.

23 Claims, 1 Drawing Figure

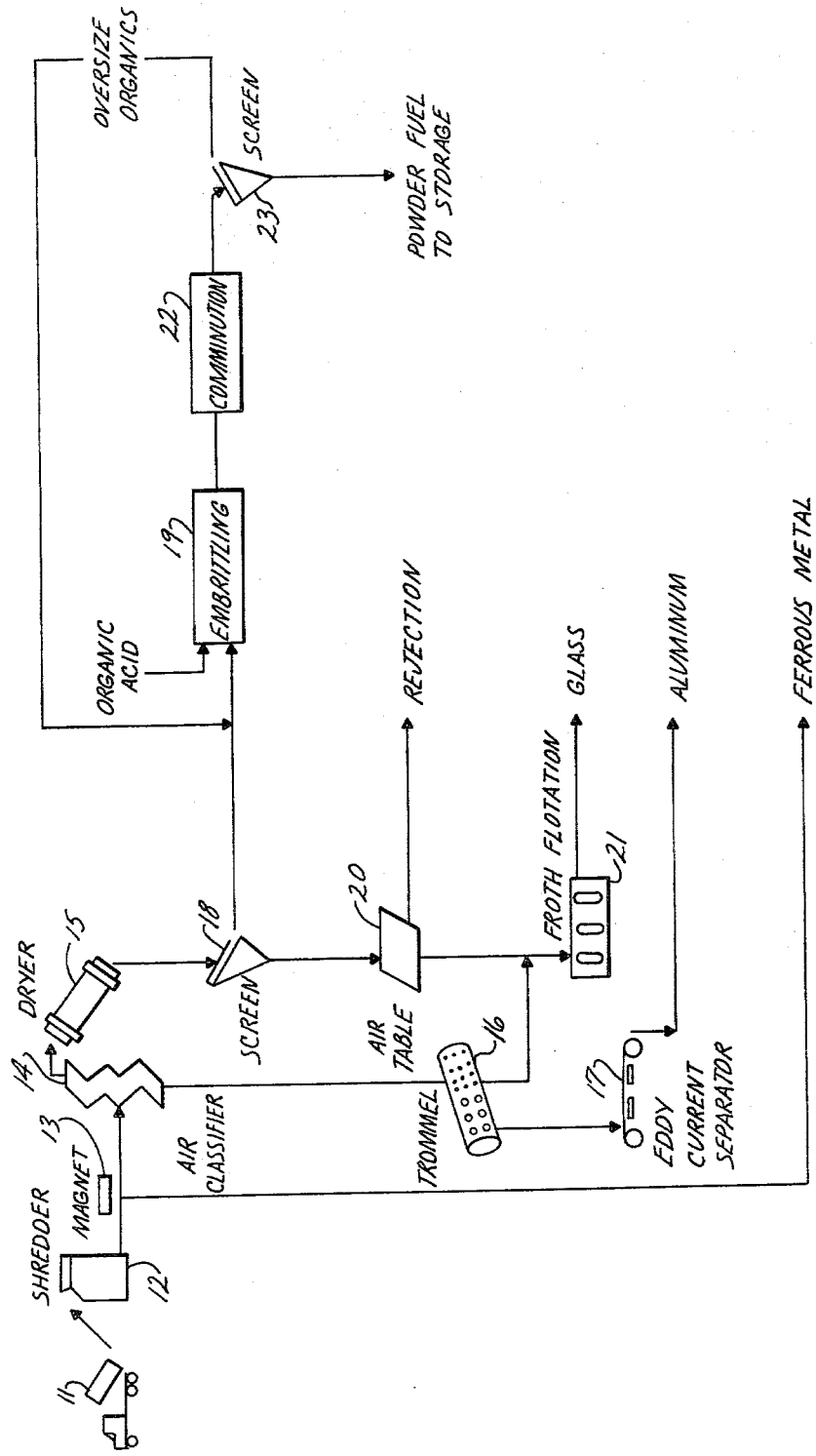

USE OF AN ORGANIC ACID AS AN EMBRITTLING AGENT FOR WASTE

BACKGROUND OF THE INVENTION

1. Field of the Invention

The instant invention relates to making a usable powdered fuel from municipal or other solid waste sources by embrittling the solid organic fraction of said waste at elevated temperatures and in the presence of an organic acid, e.g. oxalic acid, citric acid or maleic acid. After embrittlement, the embrittled solid organic fraction is comminuted, e.g. by grinding, to less than a predetermined particle size and a powdered fuel having a high caloric value is recovered. The powdered fuel may be used as is or can be cofired with other fuels such as heating oils or coal.

2. Description of the Prior Art

Many processes for the reclamation of various valuable materials from waste sources are known. For example, municipal solid waste may be a source of aluminum, ferrous metals, glass, plastics, paper and textiles.

In an exemplary process for the separation of valuable materials from solid waste sources, the incoming waste is shredded to reduce the waste to easily handled particle size, e.g. less than 4 inches. The shredded waste may be passed through a magnetic field to remove ferrous metals and subjected to air-classification or other procedures known in the art to separate the lighter materials, such as the various organics present in the waste, from the heavier materials such as glass, rock, dirt, etc. The heavier materials may be further treated to remove the electroconductive, non-magnetic metals, e.g. aluminum fragments, by processes that rely on the electroconductive nature of aluminum to separate it from admixture with other materials. The glass may be recovered by procedures known in the art such as froth flotation. Finally, the lighter organic materials, e.g. the overhead from the air-classification may be burned to provide heat or pyrolyzed to provide gaseous or liquid products. In general, the objective of municipal waste treatment processes is to recover all valuable materials and minimize the amount of said waste that must be disposed of as landfill.

In a process described in U.S. Pat. No. 3,961,913 and No. 4,008,053, the solid organic fraction of municipal waste or other waste is converted into a powdered fuel. In the process described in these patents a mineral acid is used to embrittle the organic fraction and said embrittled organic fraction is then ground to a powdered fuel. The difficulty inherent in this process is that the mineral acids such as hydrochloric acid or sulphuric acid, while efficient for embrittling the solid organic fraction, leave various undesirable moieties in the powdered fuel. For example, fuel derived from the solid organic fraction of municipal solid waste is, in and of itself, very low in sulphur. When sulphuric acid, however, is utilized as the embrittling agent in the above process, significant amounts of sulphur remain in the powdered fuel that is recovered. It is known in the art that the burning of sulphur containing fuels is undesirable from an environmental standpoint.

The use of hydrochloric acid as the embrittling agent results in a significant amount of chlorine in the powdered fuel recovered from the process. Hydrochloric acid causes corrosion problems, during the embrittlement process as well as during the burning of the powdered fuel derived from the hydrochloric acid embrittlement process. In order to use the above powdered fuels, additional treatment of the fuel to remove sulphur or chlorine is required prior to or during the combustion process to prevent these undesirables from entering the environment. These additional requirements, of course, decrease the value of the solid fuel made by the process described in the above patents.

Another reference which suggests the use of chemical embrittling agents to facilitate the conversion of the solid organic fraction of municipal solid waste into a powdered fuel is EPA-600/7-78-143, authored by N. L. Hecht, et al. and entitled "Investigation of Advanced Thermal-Chemical Concepts for Obtaining Improved MSW-Derived Products", August, 1978. The authors in this report tested formaldehyde, hydrochloric acid, chlorine, sulphur dioxide, etc. as chemical embrittling agents. In addition, experiments involving the use of formic acid and acetic acid with formaldehyde were run but the authors concluded that these combinations failed to produce "significant embrittlement". Finally, the authors did not disclose the particle size of the powdered fuel which they obtained in any of their experiments.

The above problems associated with the prior art processes for preparing powdered fuel from municipal and other waste sources are overcome by the method of the instant invention.

BRIEF SUMMARY OF THE INVENTION

The instant invention relates to a method of converting the solid organic fraction of waste into a powdered fuel which comprises heating said solid organic fraction in the presence of an organic acid for a time and at a temperature sufficient to embrittle said solid organic fraction, comminuting said embrittled solid organic fraction to a powder which is less than a predetermined particle size and recovering said powder for use as a fuel. The solid organic fraction is thereby converted to a densified, easily storable fuel product by the method of the instant invention.

The method of the instant invention is suitable for converting any waste from whatever source, provided such waste has a significant cellulosic fraction. Thus, municipal solid wastes, industrial wastes, agricultural wastes, etc., can be treated by the method of the instant invention provided an economically significant fraction of such waste is cellulosic in nature. Other organic fractions may be present in the waste, such as plastic, rubber, fat, oil, manure, etc., and will contribute to the heating value of the powder fuel recovered from the waste. However, it is believed that the cellulosic fraction is most significantly affected by the method of this invention.

BRIEF DESCRIPTION OF THE FIGURE

The FIGURE describes a flow scheme for the preferred embodiment of the method of the instant invention.

DETAILED DESCRIPTION

The instant invention relates to a method of converting the solid organic fraction of solid waste, e.g. municipal solid waste, into a powdered fuel by heating such solid organic fraction in the presence of an organic acid for a time and at a temperature sufficient to embrittle said solid organic fraction, comminuting said embrittled solid organic fraction to a powder, e.g. by grinding, and recovering said powder.

The solid organic fraction may be treated by the method of this invention either after or prior to separation from the remaining waste. For example, after shredding, the organic fraction of the waste might be removed from other components by processes known in the art such as air classification, etc. The solid organic fraction may then be embrittled by the method of this invention and ground into a powder. Alternatively, the shredded waste can be treated by the method of this invention whereby the organic fraction is embrittled and the shredded inorganics in the waste can function as a comminuting aid prior to their separation from the organic fraction.

For the purpose of this invention the term organic acid shall mean a low molecular weight organic acid, preferably a monocarboxylic or polycarboxylic organic acid having from two to ten carbon atoms; more preferably from two to four carbon atoms. The term low molecular weight organic acid is intended to exclude fatty acids such as stearic acid, etc., which function as lubricating aids and, therefore, would be detrimental for comminuting the embrittled solid organic fraction. Examples of suitable organic acids include formic acid, chloracetic acid, oxalic acid, maleic acid, citric acid, hydroxy acetic acid, etc.

Furthermore, it is appreciated that due to the varying nature of solid waste, certain of the claimed organic acids may originate in the waste or may be generated during the embrittling reaction. Such origination or generation of the organic acids are within the scope of the instant claimed invention.

Preferably the organic acid will contain only carbon, hydrogen and oxygen, that is hetero atoms such as sulphur and chlorine will be excluded so that such atoms do not remain in the powdered fuel prepared from the embrittlement process. Certain low molecular weight organic acids are preferred for economic and environmental reasons. For example the more common organic acids such as acetic acid, fumaric acid, citric acid, oxalic acid, may be used since they are effective on an economical basis and do not require the use of anti-pollution measures during the embrittlement process. It has also been found, surprisingly, that certain organic acids are more efficient as embrittling agents than the prior art sulphuric acid. For example, citric acid, maleic acid and oxalic acid are especially preferred as these acids, on an equal weight basis, provide more efficient embrittlement of solid waste than sulphuric acid. The most preferred organic acid is oxalic acid which, as shown in the working example is more effective than the others.

The dosage of the organic acid may range from 0.1% to 10% by weight, preferably from 0.1% to 2%. Dosage shall be defined for the purposes of this specification as weight parts organic acid per 100 weight parts of the dried solid organic fraction, expressed as a percent. The organic acid may be added as a powder, liquid or gas depending on its nature. However, to ensure proper distribution in the solid waste, the organic acid is generally added as a solution, preferably an aqueous solution, e.g. the preferred oxalic acid may conveniently be added as a 20 weight % solution in water.

The organic acid may be a single acid or a combination of any two or more described above. In general the total amount of such organic acids (including organic acids present in the solid waste or generated during the embrittling process) will be within the above dosage ranges.

While the temperature of embrittlement will vary with the dosage of organic acid and the nature of the solid waste being embrittled, a temperature of at least 125° C. is required. Preferably the temperature will be from about 150° C. to about 175° C. Optimum temperatures for the embrittlement process at any given organic acid dosage can be determined in a limited number of experiments by those skilled in the art.

The time required for such embrittlement will also be relative to the organic acid dosage as well as the nature of the solid waste. In addition, the time will be related to the temperature of embrittlement as will be appreciated by those skilled in the art. Preferably, because of economics, the time for embrittlement will be less than one (1) hour, e.g. from about 20 to 40 minutes.

The embrittlement process of the instant invention may be carried out under any atmosphere. The oxygen partial pressure, however, should be insufficient to cause an explosion or to allow significant combustion of the organic fraction of solid waste. Preferably less than 10% oxygen will be present during the embrittlement reaction. Suitable atmospheres include $CO_2$, $N_2$, $CO$, $H_2$, $H_2O$, etc. For the sake of economy and safety, the embrittlement process may be carried out under an atmosphere generated by a state of the art inert gas generator.

The embrittlement process of the instant invention may be carried out in any of the known devices used in municipal solid waste treating. For example, since the embrittled solid waste should be comminuted to less than a predetermined particle size, the embrittlement step can be carried out simultaneously with comminution in any suitable device or alternatively, the solid waste could be embrittled prior to comminution. It will be appreciated that the embrittlement process will be carried out to the extent suitable for comminuting the embrittled solid organic fraction with a minimum expenditure of energy. It is desirable to recover a solid fuel powder having a particle size of less than 10 mesh; more preferably less than 20 mesh (Standard Tyler Screen Scale). Therefore, the comminution will be carried out until at least a substantial portion of the embrittled solid organic fraction is less than said predetermined particle size. The partially comminuted powder can be treated to remove particles returned to the embrittlement step. Alternatively, comminution can be continued until substantially all of the embrittled solid waste is below the predetermined limit.

The recovered powdered fuel can be burned in its powder form or it may be pelletized either by compression (with or without the use of binders such as starch, etc.) Alternatively, the powder can be slurried with an oil and such slurry utilized as a fuel. In any event, by means of the method of the instant invention, the solid organic fraction of the waste will be densified, and therefore, of a much decreased volume. Of course, a densified material is more easily handled. Furthermore, in the densified state the solid organic waste is more economical to store. The objective of this invention is to provide this densified, easily stored material without significant loss of the heating value of the solid organic fraction. In the instant process, the embrittlement conditions are maintained so that no pyrolysis or substantial decomposition occurs, i.e. dry weight loss is held to a minimum, so that preferably less than 10% of the heating value of the solid organic fraction is lost in the conversion to powdered fuel.

DESCRIPTION OF THE PREFERRED EMBODIMENT

The FIGURE shows a complete scheme to process municipal solid waste (MSW) into valuable materials, which scheme includes the conversion of the solid organic fraction of MSW into a powdered fuel by the instant novel embrittling method. There is provided a waste collection storage and transfer area where dump trucks (11) or similar refuse transport units are continuously employed to deposit municipal solid waste for processing and recovery of the valuable materials contained therein.

After the removal of the oversized bulky waste, e.g. refrigerators, etc., the MSW may be dumped directly on to a conveyor (not shown) for transfer to the primary shredder 12. The primary shredder may be a ring grinder, attrition mill, impact mill, hammer mill or the like. A hammer mill is preferred for shredding efficiency and relatively low maintenance requirements.

The shredder comminutes the waste independent of its makeup to a size suitable for classification into a predominantly organic and inorganic fraction. Approximately 80% or more of the feed to the primary shredder is comminuted to a size of about 4 inches or less.

The comminuted MSW is conveyed to a magnetic separator 13 wherein a ferrous metal fraction comprising substantially all of the ferrous metals, such as shredded tin cans, is removed from the comminuted MSW by magnetic separation. The ferrous metal-free, comminuted MSW remaining after magnetic separation is transferred to an air-classifier 14 by suitable conveying means. In the air-classifier, the separation of the ferrous metal-free, comminuted MSW into a light organic fraction and a heavy inorganic fraction is obtained. As shown the air-classifier provides a zig-zag path for particles and air flow. The purpose is to impart a stop-start tumbling process to particles with many different exposures to upwardly flowing air and the downward force of gravity. The end result is the elutriation of the light organic fraction from the ferrous metal-free comminuted MSW fed to the air-classifier. The elutriated organic fraction is transported to the dryer 15 by conveyor means. The heavy inorganic fraction from the air-classifier may be subjected to further comminution (comminution means not shown in FIGURE) prior to sending such heavy inorganic fraction to a trommel screen 16 wherein the smaller particle fraction of such heavy inorganic fraction is removed therefrom. Other methods for separating the ferrous metal-free, comminuted MSW into an organic fraction and an inorganic fraction are known in the art and may be substituted for the air-classification disclosed herein. Alternatively, the organic fraction may be separated from the comminuted MSW prior to the removal of the ferrous metal fraction although this method is less preferred.

At the trommel screen the heavy inorganic fraction is separated into essentially two separate fractions. The large particle fraction, for example, in the range of from about 0.5 inches to about 3 or 4 inches contains a proportionally high percentage of aluminum and is, therefore, transferred to eddy-current separator 17 which separates non-ferrous metals, namely aluminum, for sale. A suitable eddy-current separator is described in U.S. Pat. No. 3,950,661 hereby incorporated by reference for that purpose. The small particle fraction, from the trommel screen, that is the fraction that is 0.5 inches and less, is rich in glass and, therefore, may be conveyed to the glass recovery operation described further below. Other methods for classifying the heavy inorganic fraction into the above described small and large particles fractions may be substituted for the preferred trommel screen.

The elutriated organic fraction from the air-classifier is sent to dryer 15 wherein it is treated at a sufficient temperature in the presence of a dry gas, to reduce the moisture content of such fraction. The elutriated organic fraction preferably comprises at least 85% by weight organic materials on a dry basis and the remainder is finely divided inorganics such as glass. Drying may be carried out by either direct or indirect heating in equipment known in the art. For example, flue gas can be passed through the organic fraction in a drum dryer. Upon exiting the dryer, preferably the moisture content of such organic fraction will be less than about 10% by weight. The dry organic fraction exiting dryer 15 is conveyed to a screen 18 to separate larger organic particles from any residual recoverable inorganic constituent such as glass, which may have eluded classification in the air classifier 14. Since the density of inorganic particles typically is greater than the density of the organic particles, any inorganic particles carried overhead in the air classifier tend to be smaller than the organic particles carried overhead. Therefore, predominantly inorganic particles fall through screen 18. The oversized materials from screen 18, i.e. the organic particles, are sent to the embrittling reactor 19 further described below.

The finely divided inorganic particles falling through screen 18 are conveyed to an air table 20, wherein glass is separated from other inorganics to facilitate the recovery of the glass in the froth flotation unit described below. A typical air table, also referred to as a gravity separator, comprises a perforated platform with a series of riffles running lengthwise. The platform can be inclined in a single plane or in two planes. In operation, the inorganic particles are placed on the high point of the platform and the platform is vibrated in two directions. In one direction the vibrator has high acceleration and in the other direction a lower acceleration.

Air is blown through the perforations of the air table by a blower (not shown) which gives the inorganic particles a slight lift. The lighter material which is about 40% or more glass, generally jumps the riffles and falls off the side of the table opposite the heavier material, which follows the riffles along the length of the table and falls off into a reject bin. This reject may be used for landfill.

The glass from air table 20 is conveyed to a froth-flotation unit 21, preferably after slurrying with water. As shown the glass recovered from the air table may be admixed with the small particle fraction from the trommel screen 16 prior to treatment in the froth-flotation unit 21. Methods for froth-flotation of glass collected from a municipal solid waste treating process are known in the art and they are not described further herein. A suitable method of recovering the glass fraction by froth flotation is disclosed in U.S. Pat. No. 4,077,847, hereby incorporated by reference.

The oversize materials from the screen 18, i.e. the organic particles, are conveyed to embrittling 19 by any suitable conveying means. Embrittling reactor 19 may be a rotary drum drier or other means known in the art for providing heat to a finely divided organic material.

Means for providing the organic acid in the gaseous, solid or liquid state, are also associated with said embrittling reactor. Preferably from about 0.1 to about 5% dosage of oxalic acid is added as a 10 to 20 weight % aqueous solution. The reaction takes place at a temperature of at least 125° C., preferably from about 150° C. to 175° C. The residence time in the embrittling reactor is generally 20 to 40 minutes. The embrittled material is conveyed from reactor 19 to comminution apparatus 22 which may be, for example a ball mill, an attrition mill, a hammer mill, etc. Of course, the embrittling and comminution can take place in a single unit as will be appreciated by those skilled in the art.

The embrittled material is comminuted until at least 25 weight % of the embrittled material has a particle size of less than 10 mesh. The comminuted material is conveyed to a screen 23 wherein the oversized particles are removed and sent back through the embrittling reactor. Particles which pass through the screen are recovered as a powdered fuel.

EXAMPLE 300 grams of shredded and partially dried municipal solid waste was placed into a ceramic laboratory pan. Six hundred milliliters of solution was added with continuous stirring, the solution being a 1% wt./volume solution of the organic acid of interest. Control samples utilized were a sample treated with 600 ml of water only, and with 6 g of sulfuric acid added as 40% wt./volume solution. The mass of solutions plus samples were throughly mixed by hand after which the samples were dried to constant weight in nitrogen gas at 110° C. The dried samples were then heat-treated in nitrogen for 1.5 hours at 150° C., and cooled in nitrogen. Cooled samples were ground in a ceramic ball mill for ten minutes after which the balls and ground organics were separated on a coarse screen. The analyses below were conducted by using standard testing sieves and a Ro-Tap ™ shaker through 1180 um (14 mesh) and an Alpine-Jet Sifter ™ from 841 um through 38 um (400 mesh). The numbers below are in % by weight.

TABLE 1

| Size, um | No Additions | Water Only | Sulfuric Acid | Acetic Acid | Oxalic Acid | Citric Acid | Maleic Acid |
|---|---|---|---|---|---|---|---|
| 4750 | 76.7 | 7.2 | 3.5 | 8.6 | 0.6 | 2.9 | 2.4 |
| 3350 | 0.7 | 0.4 | 0.4 | 0.6 | 0.4 | 0.4 | 0.5 |
| 2360 | 3.4 | 1.7 | 1.4 | 2.8 | 0.6 | 2.3 | 1.2 |
| 1700 | 3.4 | 1.5 | 1.3 | 2.5 | 0.6 | 1.6 | 1.2 |
| 1180 | 3.2 | 1.6 | 1.4 | 2.5 | 0.6 | 1.8 | 1.3 |
| 841 | 0.7 | 0.7 | 0.7 | 1.5 | 0.8 | 0.7 | 0.9 |
| 297 | 1.7 | 4.0 | 2.9 | 3.8 | 1.4 | 2.2 | 2.8 |
| 149 | 1.4 | 1.2 | 2.2 | 4.1 | 2.0 | 3.1 | 3.4 |
| 105 | 0.7 | 3.5 | 2.4 | 2.3 | 0.9 | 2.2 | 2.0 |
| 75 | 1.0 | 5.4 | 4.2 | 3.6 | 2.3 | 4.0 | 3.4 |
| 45 | 2.0 | 6.3 | 8.1 | 10.4 | 6.0 | 7.1 | 7.6 |
| 38 | 1.4 | 10.5 | 9.8 | 9.8 | 7.2 | 10.0 | 8.8 |
| Minus 38 | 3.7 | 55.9 | 61.6 | 47.3 | 76.6 | 61.7 | 64.4 |

In terms of producing product finer than 1700 um (the target size), all of the acids are superior to water along and both oxalic and maleic acids are clearly superior to the sulfuric acid.

I claim:

1. A method of converting the solid organic fraction of waste into a powdered fuel which comprises heating said solid organic fraction in the presence of a low molecular weight organic acid for a time and at a temperature sufficient to embrittle said solid organic fraction, comminuting said embrittled solid organic fraction to a powder and recovering said powder.

2. The method of claim 1 wherein said organic acid is a $C_2$ to $C_{10}$ organic acid.

3. The method of claim 2 wherein said organic acid is selected from the group consisting of oxalic acid and maleic acid.

4. The method of claim 2 wherein said organic acid is oxalic acid.

5. The method of claim 1 wherein the organic acid is present in a dosage of from 0.1% to 10% weight.

6. The method of claim 1 wherein the embrittlement takes place at a temperature of at least 125° C.

7. The method of claim 1 wherein a substantial fraction of said embrittled solid organic fraction is comminuted to a particle size of less than 10 mesh.

8. The method of claim 7 wherein said fraction having a particle size of less than 10 mesh is recovered by screening said comminuted, embrittled solid organic fraction.

9. The method of claim 1 wherein said embrittlement is carried out under an atmosphere incapable of allowing substantial combustion of the solid organic fraction.

10. The method of claim 1 wherein said solid organic fraction is separated from the waste prior to embrittling.

11. The method of claim 1 wherein said embrittlement is carried out at conditions whereby the loss of heating value in the conversion of said solid organic fraction into powdered fuel is less than 10%.

12. The method of claim 1 wherein the embrittlement takes place at a temperature of from about 150° C. to about 250° C.

13. A method for separating municipal solid waste (MSW), comprising an inorganic fraction; including glass, ferrous metals and aluminum; and a solid organic fraction, into valuable materials which comprises:
(a) shredding the MSW to provide a comminuted MSW;
(b) separating a ferrous metal fraction from said comminuted MSW and recovering a substantially ferrous metal-free fraction;
(c) separating said substantially ferrous metal-free fraction into an inorganic fraction, which includes glass and aluminum and a solid organic fraction;
(d) comminuting such inorganic fraction to provide an aluminum-rich fraction having a particle size greater than 0.5 inches and a glass rich fraction having a particle size of less than 0.5 inches;
(e) separating such aluminum-rich fraction from said glass-rich fraction;
(f) recovering glass from said glass-rich fraction;
(g) recovering aluminum from said aluminum-rich fraction;
(h) heating said solid organic fraction of step (c) in the presence of a low molecular weight organic acid for a time and at a temperature sufficient to embrittle such solid organic fraction;
(i) comminuting said embrittled solid organic fraction to a powder; and
(j) recovering said powder.

14. The method of claim 13 wherein the organic acid is present in a dosage of from 0.1% to 10% weight.

15. The method of claim 13 wherein the embrittlement takes place at a temperature of at least 125° C.

16. The method of claim 13 wherein a substantial fraction of said embrittled solid organic fraction is comminuted to a particle size of less than 10 mesh.

17. The method of claim 16 wherein said fraction having a particle size of less than 10 mesh is recovered by screening said comminuted, embrittled solid organic fraction.

18. The method of claim 13 wherein said embrittlement is carried out under an atmosphere incapable of allowing substantial combustion of the solid organic fraction.

19. The method of claim 13 wherein said embrittlement is carried out at conditions whereby the loss of heating value in the conversion of said solid organic fraction into powdered fuel is less than 10%.

20. The method of claim 13 wherein the embrittlement takes place at a temperature of from about 150° C. to about 250° C.

21. The method of claim 13 wherein the organic acid is a $C_2$ to $C_{10}$ organic acid.

22. The method of claim 21 wherein the organic acid is selected from the group consisting of oxalic acid and maleic acid.

23. The method of claim 22 wherein the organic acid is oxalic acid.

* * * * *

UNITED STATES PATENT AND TRADEMARK OFFICE
CERTIFICATE OF CORRECTION

PATENT NO. : 4,305,727

DATED : December 15, 1981

INVENTOR(S) : Robert C. Beers

It is certified that error appears in the above-identified patent and that said Letters Patent are hereby corrected as shown below:

Column 6, line 5, change "particles" to --particle--.

Column 6, line 65, insert --reactor-- after "embrittling".

Column 7, line 31, change "throughly" to --thoroughly--.

Column 7, line 61, change "along" to --alone--.

Signed and Sealed this

Twenty-third Day of March 1982

[SEAL]

Attest:

GERALD J. MOSSINGHOFF

*Attesting Officer*  *Commissioner of Patents and Trademarks*